United States Patent [19]

Moskowitz et al.

[11] 4,221,060
[45] Sep. 9, 1980

[54] CHILDREN'S DENTAL INSTRUCTIONAL KIT

[76] Inventors: William Moskowitz; Francine Moskowitz, both of 52 Girard St., Marlboro, N.J. 07746

[21] Appl. No.: 3,787

[22] Filed: Jan. 15, 1979

[51] Int. Cl.³ .............................................. G09B 19/00
[52] U.S. Cl. ........................................... 35/17; 46/164; 46/116
[58] Field of Search .................... 32/71; 35/17, 59; 206/83, 63.5

[56] References Cited

U.S. PATENT DOCUMENTS

| 739,980 | 9/1903 | Bryant | 32/71 |
| 760,943 | 5/1904 | Wright | 32/71 |
| 1,342,156 | 6/1920 | Brittain | 32/71 |
| 2,730,805 | 1/1956 | Smolka | 32/71 |
| 3,771,227 | 11/1973 | Black | 32/71 |
| 3,780,439 | 12/1973 | Manor et al. | 32/71 |
| 3,931,679 | 1/1976 | Carter | 32/71 |
| 4,019,522 | 4/1977 | Elbreder | 132/91 |

Primary Examiner—Robert Peshock
Assistant Examiner—John J. Wilson
Attorney, Agent, or Firm—Charles I. Brodsky

[57] ABSTRACT

A children's dental instructional kit which comes with its own toothbrush, "toothpaste", floss, mirror and disclosure tablets, and with a doll's head on a pedestal. A non-toxic stain is provided for coating the simulated teeth of the doll, and the ingredients of the "toothpaste" are of a composition such that when brushed over the teeth of the doll neutralize, or otherwise change, the stain imparted. The kit can be provided with an instructional booklet, designed to give the teaching center an overall fun-type effect in order to increase its attractiveness to younger children.

9 Claims, 3 Drawing Figures

CHILDREN'S DENTAL INSTRUCTIONAL KIT

FIELD OF THE INVENTION

This invention relates to the field of preventive maintenance in dentistry and, more particularly, to a dental instructional kit which will appeal to young children, and introduce them to the concept of proper brushing techniques.

BACKGROUND OF THE INVENTION

As is well known and understood, the number one childhood disease in the United States is that of tooth decay. As is also well appreciated, untold numbers of mothers and fathers have found it a large problem in getting their children to brush and otherwise maintain their teeth. This, in part, follows from the difficulty in getting the young child interested in his or her teeth while at an early age, and because children believe they have more important things to do than to stand around for a few minutes brushing their teeth—an unpleasant experience for them, at best. If interest could be generated in the child at a young age, the probabilities are high that the child will continue a preventive maintenance program as he or she gets older. However, even if the child does not faithfully adhere to a complete preventive maintenance routine, at least an introduction to proper techniques at an early age would most generally continue to that time when the child's attitude changes towards the need for proper dental care, as the child gets older. As such, a new awareness of correct dental care can develop, making visits to the dentist more exciting.

SUMMARY OF THE INVENTION

As will become clear hereinafter, the dental instructional kit of the invention attempts to introduce the child to a dental maintenance program through a fun-type teaching center. The intent and purpose of the kit is to generate a "game" atmosphere, which, unbeknownst to the child, imparts to his subconscious, the advantages which proper brushing produces. As part of the kit, there is provided, in one embodiment of the invention, a toothbrush, a dental mirror, floss, disclosing tablets and a tube of "toothpaste", along with a mannequin head on a pedestal having a movable jaw. In one version of the invention, a stain is included, non-toxic, in nature, to be painted onto the simulated teeth of the head, to produce a visual effect, tantamount to plaque in the mouth. The "toothpaste" is provided with a neutralizing ingredient to change the appearance of the stain when brushed along the teeth of the head, and the floss may be similarly impregnated so as to change the visual effect produced near the interproximal spaces of adjacent teeth. A story-line booklet may also be provided in the kit, explaining the manner of maintaining the doll's mouth, the brushing of the teeth, both in a manner which will appeal to young children. As will be apparent to those skilled in the art, the teaching center described herein is particularly effective in its attractiveness to children over 3 years of age.

BRIEF DESCRIPTION OF THE DRAWING

These and other features of the present invention will be more clearly understood from a consideration of the following description taken in connection with the accompanying drawing in which.

DETAILED DESCRIPTION OF THE DRAWING

Figure 1:
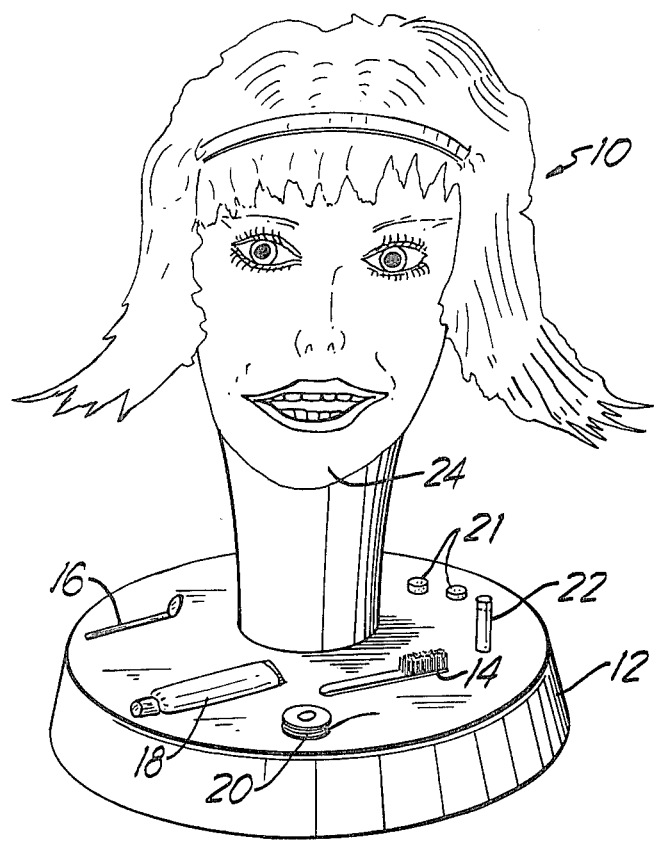
FIG. 1 shows a doll's head on a pedestal, along with other components included in the instructional kit of the invention.

In FIG. 1, the doll's head is shown by the reference numeral 10, situated atop a pedestal 12. A toothbrush 14 is shown, along with a dental mirror 16, a tube of "toothpaste" 18, dental floss 20 and disclosing tablets 21. Also shown is a vial 22 of non-toxic staining solution intended to be coated onto the "teeth" of the head 10 using a swab, brush, or other appropriate device.

Figure 2:
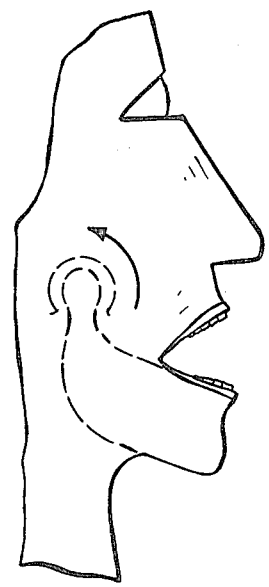
FIG. 2 shows a possible movable jaw construction for the doll's head.

In accordance with the invention, the cheeks and lips of the doll's head are made flexible—of a latex composition, for example—, and the mouth is selected slightly out of proportion to the size of the head 10, somewhat larger than consistent therewith. In addition, the lower jaw 24 is made movable, up or down, to lend access to the teeth behind, which are individually spaced from one another, but by very small amounts. In constructing the doll's head 10, the composition selected for the teeth is intended to accept a stain coated thereon, to provide a visual effect, and the resilience given to the cheeks and lips, permit the insertion, and proper workings, of the toothbrush 14 in an attempt to remove as much of the stain as possible. The lower jaw 24 is made movable to give a life-like appearance to the doll's head, and to facilitate further brushing, in a proper up and down motion, while at the same time, easing the neutralization of the stain material with the toothbrush. As shown by FIG. 2, the jaw 24 is adjustable to rotate the mouth of the doll to "open", "closed" and mid-way positions.

Figure 3:
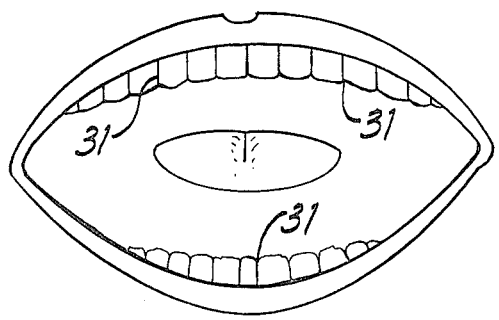
FIG. 3 shows a close-up of the mouth of the doll, selected overly large with respect to the doll's face, in accordance with the invention.

As will be apparent to one skilled in the art, the "toothpaste" is provided with a non-toxic ingredient which will neutralize the visual effect imparted on the doll's teeth by the staining solution. The "paste" can thus be put on the brush 14, for movement about the mouth, and in a manner by which the child can change the visual effect previously provided. With an included instructional booklet advising that satisfactory completion of the "game" is achieved by removing all the color stain, the child is induced to continue the brushing until complete neutralization takes effect. In order to clear the interproximal areas of the teeth (31, in FIG. 3), where the original stain may persist, the child could then turn to the dental floss 20, which, according to the invention, is impregnated with a similar neutralizing solution. As will be noted, even if the child brushes incorrectly, i.e., horizontally across the teeth, subconsciously the child is learning the effects that brushing will produce in removing food particles which tend to stay in the mouth between brushings—as well as the build-up of plaque in the mouth. When the child is further induced to move the lower jaw 24, and to then brush in an up and down motion to remove as much of the stain as possible, a further step towards the teaching of dental preventive maintenance is taken. With the use of the dental floss 20, almost all that the child can do in his or her own mouth will be portrayed, as being present in the doll's head. At the same time, the disclosing tablets 21 could be used by the child, to coat his or her own teeth, and then cleaned away by them in a manner similar to the use of the toothbrush and floss of the instructional kit to clear away the stain on the teeth of the mannequin. In making the brushing of teeth into a game, in this way, children can be turned on to teeth care at a very young age, and in a manner to help alleviate, in part, possible future problems of tooth decay.

In a preferred version of the invention, the individual teeth of the doll's head are selected of a material to accept the stain, whereas the other component parts of the doll's head are selected so as not to be responsive thereto. In this manner, only the tooth area will become colored in usage. At the same time, the resiliency of the cheeks and lips permit the retraction of those areas by the dental mirror 16, thereby permitting the child to see whether any stain remains in the back portion of the mouth. Any appropriate compositions can be used for the staining solution and neutralizing "toothpaste" ingredients, such as vegetable dyes, acide-base chemical compositions, etc., in a manner analogous to the formulation of the disclosing tablets used by the child.

While there has been described what is considered to be a preferred embodiment of the present invention, it will be readily apparent that modifications may be made by those skilled in the art without departing from the scope of the teachings herein of making dentistry a concept of fun as regards the proper teaching of brushing, instead of a chore. Thus, whereas the preferred embodiment of the invention presently envisages a kit incorporating a disclosing solution for the simulated teeth of a doll's head, a neutralizing solution to change the visual effect provided, and the putting on and/or taking off of individual visual effects with toothbrush, floss, and "toothpaste", it will be noted that the mere providing of the doll's head itself, along with the use of a toothbrush, could be employed in the teaching process of proper dental care. By utilizing resilient materials for the cheeks, lips and mouth of the head, along with a movable lower jaw and a slightly oversized mouth (to facilitate insertion of the toothbrush and an observation of its movement therein), such alone can assist in an introduction to dental maintenance, without any need for the disclosing or neutralizing solutions described. For at least such reasons, therefore, reference should be had to the claims appended hereto for a proper understanding of the true scope of the present invention.

We claim:

1. A children's dental instructional kit comprising: a doll's head having eyes, ears, nose, mouth, lips, cheeks and a set of teeth. and wherein said mouth, lips and cheeks are selected of a resilient composition to permit simulated brushing of said teeth by a toothbrush; a first solution to coat the teeth of said doll's head in providing a given visual appearance thereto; and a second solution to further coat the teeth of said doll's head during brushing to change the visual appearance given thereto by said first solution.

2. The children's dental instructional kit of claim 1 wherein the mouth of said doll's head is provided with a movable lower jaw, to permit the simulated brushing of said teeth in an upwards and downwards motion.

3. The children's dental instructional kit of claim 1 wherein the mouth of said doll's head is selected overly large with respect to the other dimensionings of the face of said doll's head.

4. The children's dental instructional kit of claim 1 wherein the cheeks of said doll's head and the lips thereof are selected of a flexible composition to permit said second solution to be brushed onto the teeth in the back portions of the mouth and in the front portions of the mouth, respectively.

5. The children's dental instructional kit of claim 1 wherein the teeth of said doll's head are individually spaced one from another, to permit said first and second solutions to be coated in the interproximal spaced therebetween.

6. The children's dental instructional kit of claim 5, also including a toothbrush for brushing said second solution onto the teeth of said doll's head.

7. The children's dental instructional kit of claim 6, additionally including floss impregnated with said second solution for introducing said second solution into the interproximal spaces between the individual teeth of said doll's head.

8. The children's dental instructional kit of claim 7, further including a mirror for insertion into the mouth of the doll's head to observe said visual appearance and any changes therein produced by brushing the teeth in the side and back portions of said mouth.

9. The children's dental instructional kit of claim 8 additionally including disclosing tablets for insertion into the child's own mouth, to observe the visual appearance produced therein and any changes produced by brushing his or her own teeth.

* * * * *